July 23, 1957 W. E. ASHENFELDER ET AL 2,799,975
SURFACE GENERATOR
Filed Sept. 26, 1955 4 Sheets-Sheet 1

INVENTORS:
Warren E. Ashenfelder
Robert P. Johnson
Nathan T. Wilcox
By Herbert E. Metcalf
Their Patent Attorneys

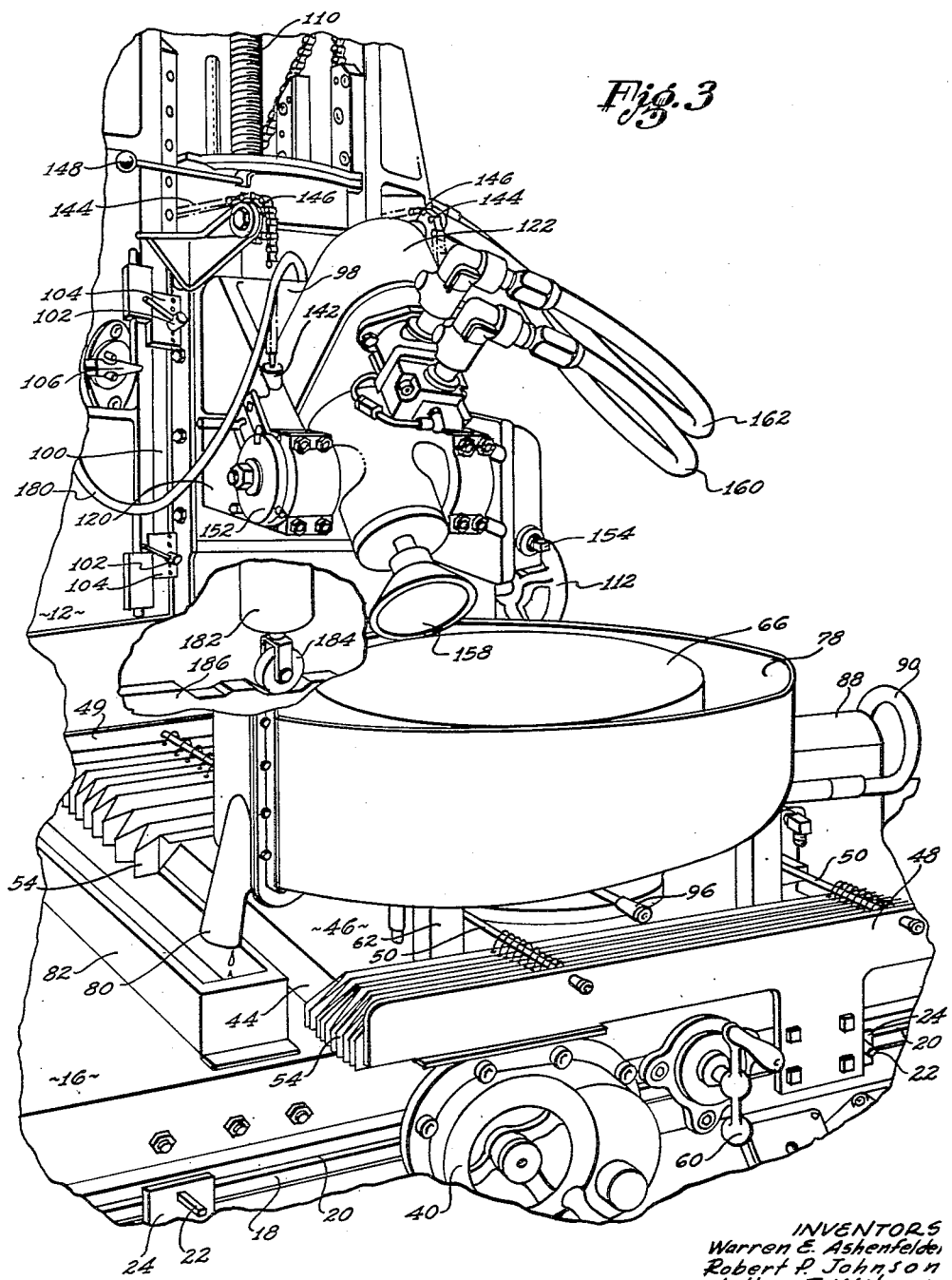

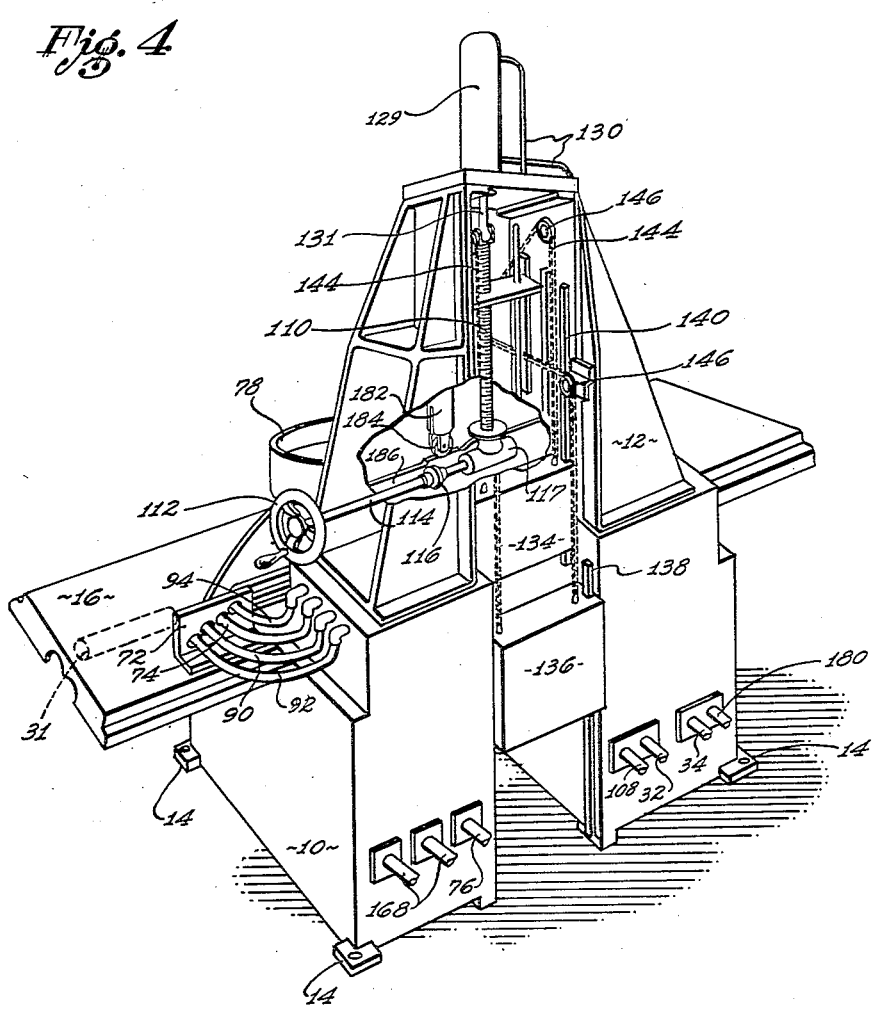

United States Patent Office 2,799,975
Patented July 23, 1957

2,799,975

SURFACE GENERATOR

Warren E. Ashenfelder, Gardena, Robert P. Johnson, Pasadena, and Nathan T. Wilcox, Arcadia, Calif., assignors to Northrop Aircraft, Inc., Hawthorne, Calif., a corporation of California Application September 26, 1955, Serial No. 536,533

8 Claims. (Cl. 51—95)

This invention has to do primarily with hydraulics and more particularly with a hydraulic and mechanical machine for generating, on solid materials, surfaces having a wide variety of configurations.

The science of optics and optic grinding has for centuries been, for all intents and purposes, retained in the control of a select few. The preparing of lenses and optics was considered a secret art and by virtue of that fact little information was published regarding it. As a result few advances were made. No information was made available to stimulate the mind, the science or the industry. Generations devoted their talents to preparing optics by the hand cutting and grinding methods.

However, with the rather recent introduction of mass production techniques applied to the optics industry, progress is being made to improve the quality and quantity of the optical product. Even so, the techniques being applied prior to the present invention have been restricted to the preparing of small lenses in a limited number of configurations. Recent demands are concerned with large lenses as well as small. Until the present invention was conceived, machine production of lenses was confined to glass blanks having a dimension generally not exceeding twelve inches. Further, the machines were restricted in accuracy and the operations that could be performed.

The principal object of this invention is to provide a hydraulic and mechanical machine, having great accuracy, in the nature of a surface generator, principally intended for glass, but able to accommodate metal and other solid blanks as well, and grind or cut the blanks into a large variety of configurations.

Another object of this invention is to provide a surface generator for glass which may be operated by a semi-skilled artisan and accomplish results formerly attained only by a skilled craftsman.

A yet further object of this invention is to provide a surface generator for glass that incorporates as a part thereof structures that are in combination adapted to paths of travel in virtually every direction.

Broadly described, the invention comprises a base and column. Mounted upon the column is a reciprocable ram or head, and rotatably mounted on the head is a spindle and cutting tool, all of which are hydraulically and in some instances mechanically actuated.

Mounted on the base is a reciprocable bed and table, and on the table is mounted a rotatable pedestal that is to receive the blank material to be formed. Most of the structure enumerated is hydraulically and in some instances mechanically actuated.

Associated with the base and column is a cam and template that provides a means whereby materials may be prepared in an infinite number of shapes.

Figure 3 is an enlarged, perspective view illustrating, in part, the ram or head, spindle and associated structure as well as a cam and template for controlling the position of the ram when a surface is to be ground on the glass or metal blank that is to conform to the configuration of the template.

Figure 4 is a perspective, three-quarter rear view of the invention illustrating certain balancing weights, controls, and lines.

Figure 1:
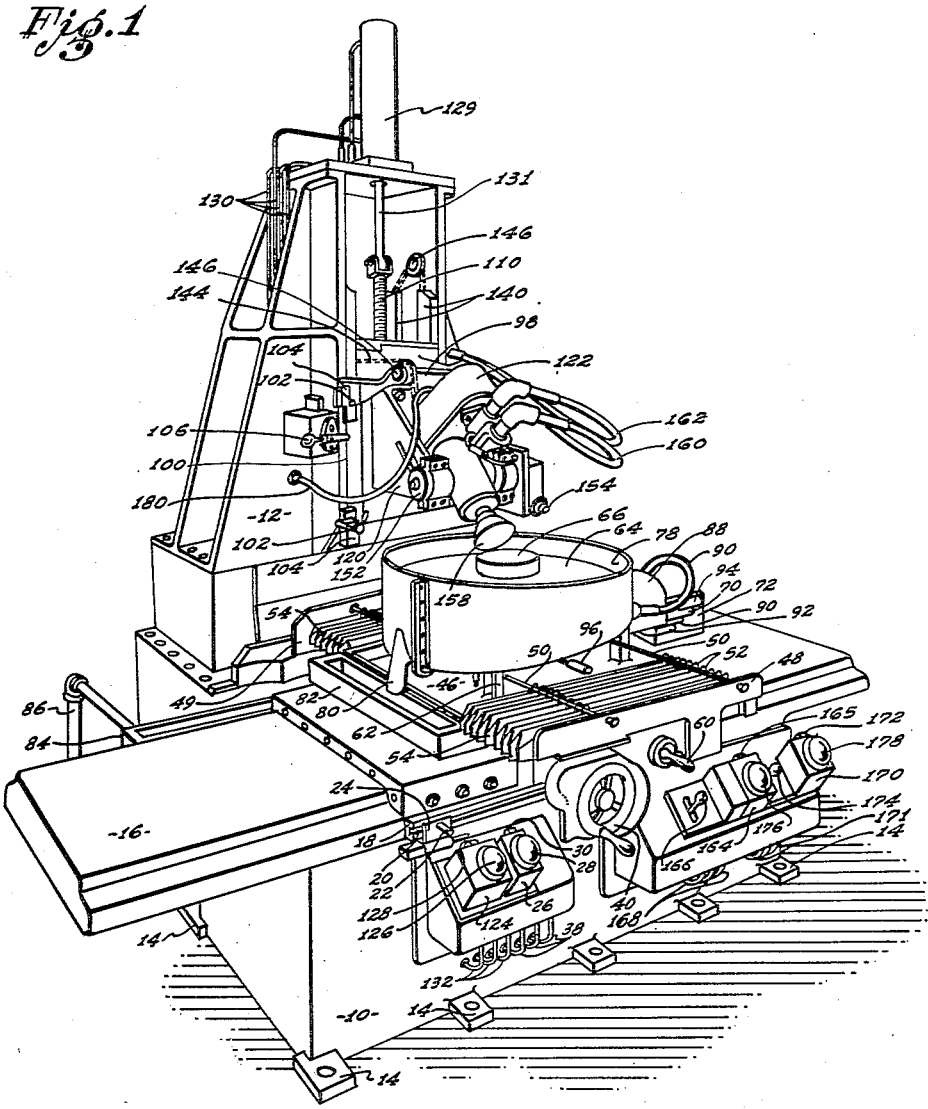
Figure 1 is a perspective, three-quarter front view illustrating the device of this invention as it may be viewed from the left side.

Referring to the drawings for a more detailed description of the present invention, 10 designates a horizontal base and 12 a vertical column.

The base rests upon a plurality of feet 14 all of which are connected to strain gages for the purpose of equalizing the strains imposed on the surface generator and for the purpose of establishing a level condition. Due to the sensitivity of the machine as a result of its weight, as well as other factors, and to the fact that work to close tolerances is to be performed, it is essential that some means be made available for equalizing strains and leveling the equipment. Various factors, such as earthquakes, a passing train or an aircraft passing through the sound barrier to cause shock waves can cause disturbances of great enough magnitude to dislodge the surface generator from an equally balanced and level condition. As a result, the commonly known expedient of connecting supporting feet to strain gages is utilized. The strain gage indicators constantly make known to the operator the condition of the surface generator.

Figure 2:
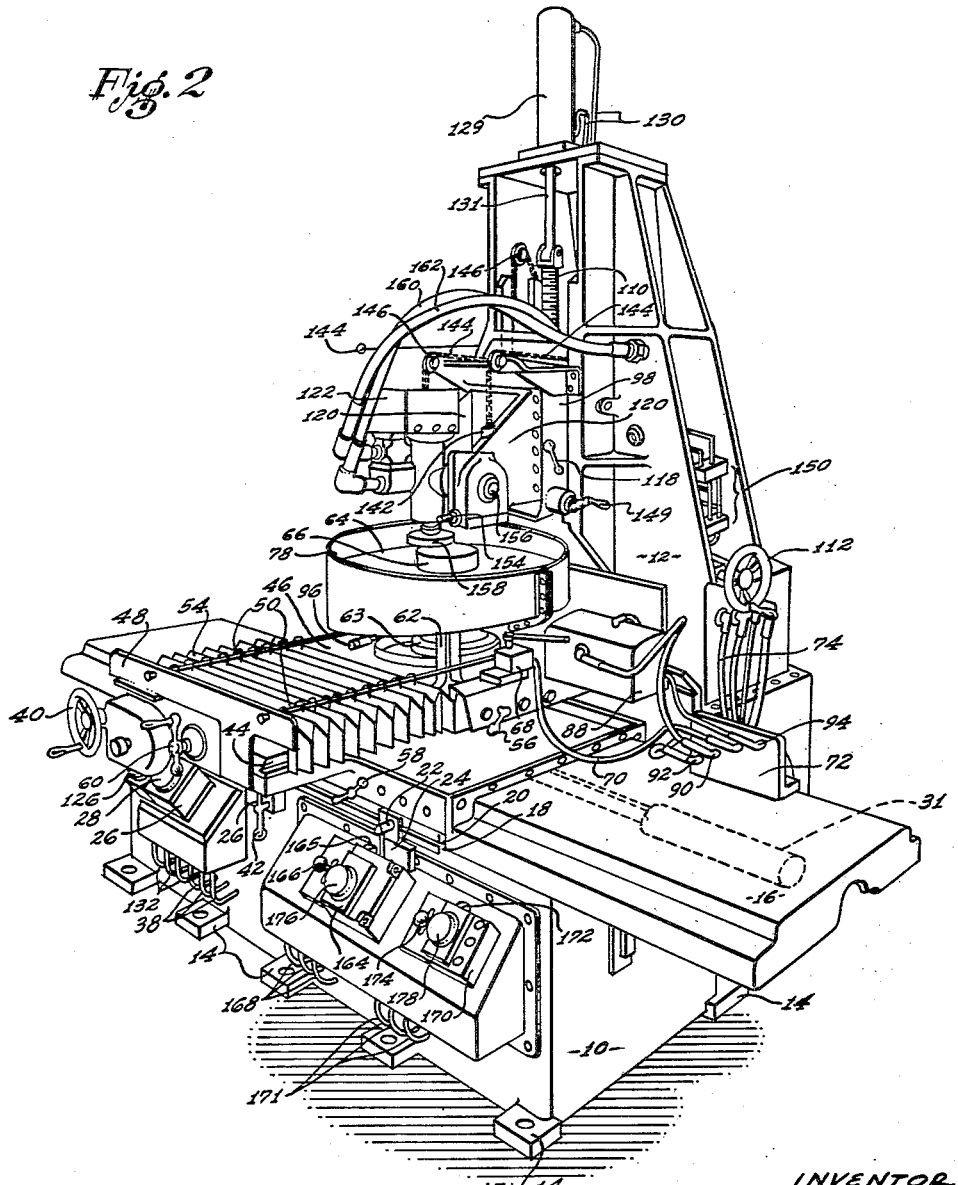
Figure 2 is a perspective, three-quarter front view illustrating the invention as it may be viewed from the right side.

Reciprocably mounted on the base 10 is an elongated bed 16, both ends of which extend beyond the base as may be seen in Figures 1, 2 and 4. Secured to the side of the bed 16 is a slotted bar 18 and into each end of the slot 20 extends a pin 22 of a stop 24. The stops may be moved along the bar and locked in a selected position.

Mounted on the base 10 is a hydraulic valve 26 having a handle 28 that provides for the speed of travel of the bed 16 and a needle metering valve 30 that controls the flow of hydraulic fluid to the valve 26. Located under the bed 16 is a hydraulic cylinder 31 to which the valve 26 is connected.

Communicating with a hydraulic fluid supply source and extending from the back of the base 10 to the cylinder 31 are a pair of hydraulic lines 32 and 34 that supply and carry from the cylinder 31 and valve 26 hydraulic fluid. The lines to and from the valve 26 are grouped together into a nest 38 to form supply and discharge lines.

In addition to the hydraulic control for the reciprocable movement of the bed 16 there is a manual control represented by the hand wheel 40 that is a part of a conventional worm gear drive.

Secured to the base 10 is a hydraulic trip valve 42, having a projecting finger thereon, that is engaged by the pins 22 to cause the flow of fluid in the hydraulic valve 26 to change, resulting in reversing the direction of the path of travel of the bed 16 when in operation.

For instance, assume the bed 16 to be traveling to the left as it is viewed in Figure 2. The pin 22, shown, engages the trip valve 42 resulting in changing the flow of fluid in valve 26. This change of flow causes the bed 16 to stop, reverse direction and move to the right. When the pin 22, opposed to that one first mentioned and shown in Figure 1, engages the trip valve 42, the travel of the bed 16 is again stopped by a change of flow of fluid in valve 26, and reverses its direction of travel and again moves to the left.

The mechanical control of the bed 16 through the medium of the hand wheel 40 and worm gear drive is to position the bed 16 in relation to the work to be performed and to properly determine the position of the stops 24 and the length of travel the bed 16 is to assume.

Integral with the bed 16 and extending transverse to the longitudinal axis thereof are spaced apart V-ways 44 only one of which is shown. Reciprocable in the V-ways 44 and in a direction perpendicular to the path of travel of bed 16 is a table 46. Secured to the head and back of the V-ways are brackets 48 and 49 and supported therebetween are a pair of spaced apart rods 50. Slidable on the rods 50 are a plurality of rings 52 to which is attached accordion covers 54 for protecting the V-ways 44.

Located on the side of table 46 is a lock 56 for locking the table on the V-ways 44 in an established or selected position. A similar lock 58 is mounted on the bed 16 and has as its purpose the locking of said bed.

Also mounted at the head of the V-ways 44 is a micrometer handle control 60 that represents a worm gear drive for the table 46. Through the medium of this handle 60 and the related worm gear drive, broad as well as minute reciprocable movements of the table 46 may be made.

It is obvious that the accordion covers 54 also have for their purpose the protection of the worm gear drive to which handle 60 is attached.

Secured to the table 46 is a foundation support 62 upon which is located a hydraulically actuated rotary pedestal 63. A part of the pedestal is a plate 64 having centrally located therein a circular grid. The material 66 to be cut or ground is placed upon this grid and a vacuum drag is imposed through a vacuum valve 68 on table 46 and line 70 to retain the material firmly in place. The line 70 projects through a bracket 72 on bed 16 and connects to or is a continuation of a vacuum line 74. The vacuum line projects out the rear of the base 10 and is designated 76. This line 76 is in turn connected to a vacuum pump.

There are in reality several interchangeable plates 64 each having a grid of a diameter different than the other to accommodate materials having a diameter up to twenty-six inches.

Circumscribing the pedestal 63 is a coolant container 78 having an inclined bottom. Formed in the side of the container 78 is a coolant discharge spout 80 that discharges the coolant into a trough 82 mounted on the bed 16. From the trough 82 the coolant flows into another trough 84 and from the last mentioned trough the coolant flows into line 86 and back to source where it again is recirculated through the coolant system to cool the material 66 as it is being ground or cut.

Also mounted on the table 46 is a fluid or hydraulic motor 88 that rotates the pedestal 63. The motor is actuated by hydraulic fluid inlets and outlets 90 and 92 which are connected to a source. The motor 88 has a fluid drain line 94 which is connected to the source and through which the fluid flows from the motor 88.

Extending outwardly from the pedestal 63 toward the bracket 48 is the handle 96 of a friction brake that has for its purpose the retarding or stopping the rotation of the aforementioned pedestal 63.

Reciprocably mounted on the column 12 is a ram or head 98 and on the ram is a slotted bar 100 similar to that on the bed 16. Into the slot extends pins 102 of stops 104. These pins 102 like pins 22 may be moved along the slot and also like pins 22 strike a hydraulic trip valve 106, mounted on column 12, similar in configuration and operation to that of trip valve 42, to limit the reciprocable path of travel of the ram 98 in each direction.

The hydraulic fluid for each of the trip valves 42 and 106 is supplied by line 108 extending from the back of the base 10 toward the front. Like all the other hydraulic lines, line 108 is connected to a common hydraulic fluid source.

The ram 98 like the bed 16 has a manual means of reciprocable operation as well as a hydraulic. The ram 98 is connected to a worm gear drive 110 which is operated by a hand wheel 112 through the medium of rod 114, universal couplings 116 and gears in gear box 117.

There is also provided on the ram 98 a friction lock 118 to lock it in a selected position if desired.

The ram 98 has a pair of spaced apart arms 120 thereon that support therebetween a hydraulically actuated spindle 122.

Located on the front of the base 10 adjacent valve 26 is another hydraulic valve 124 having a speed adjusting handle 126 and fluid flow control needle metering valve 128. This valve 124, with the assistance of hydraulic cylinder 129, the latter being similar to cylinder 31, controls the reciprocable movement of the ram 98. The worm gear 110 is interconnected to the cylinder 129 through rod 131. The hydraulic fluid is supplied to valve 124 and carried therefrom by previously referred to hydraulic lines 32 and 34. However, between these hydraulic lines 32 and 34 and the valve 124 and cylinder 129 are hydraulic lines 130 and 132 that are directed to the various chambers and compartments of the valve. Further, these nests of lines also include drain lines.

In order to relieve some of the work imposed on the hydraulic valve 124 and cylinder 129 and to insure a smoother movement of the ram 98, the latter has connected thereto a pair of counter-balancing weights 134 and 136. The weights are reciprocably guided in the column 12 by spaced apart weight ways 138 and 140. The weights are connected to the ram at 142 through the medium of sprocket chains 144 that are threaded over a plurality of idler sprockets 146; the latter being rotatably mounted on the sides of the column 12.

Located adjacent the top of the ram 98 is a handle 148 of a vertical valve feed for controlling the valve 124 to permit the ram 98 to be lowered or raised. This is a feature that is in addition to the automatic, reciprocable hydraulic control of trip valve 106.

Also mounted on the ram is a micrometer manual drive 149 for the ram that has for its purpose the minute adjustment of the ram 98.

In addition to the manual adjustment of the ram 98 there is also a hydraulic valve 150 that automatically lowers the ram a minute amount each time the bed 16 completes a cycle of travel. This valve system 150 may be pre-set to perform in a manner to give very fine incremental movements of ram 98.

The previously referred to spindle 122 is rotatable between arms 120 and has a number of elements for obtaining this purpose. There is first a broad or approximate spring loaded lock 152 that permits the spindle 122 to be rotated from the vertical position as viewed in Figure 2 to the approximate inclined position as viewed in Figures 1 and 3. There is an intermediate adjustment 154 that more closely places the spindle in the position of operation, and there is finally a fine micrometer adjustment 156 that enables the spindle to be exactly positioned at the proper inclined angle.

The spindle 122 has chucked therein a suitable diamond impregnated cutting instrument 158.

The spindle 122 is in essence a fluid or hydraulic motor and is actuated by hydraulic fluid entering and leaving lines 160 and 162, and like all the other hydraulic lines, the last mentioned are in communication with a hydraulic fluid source. However, the entrance and exit of the hydraulic fluid into the spindle 122 through lines 160 and 162 is controlled by a hydraulic valve 164 having an attached fluid flow control needle metering valve 165. Along with the valve 164 is a manually actuated valve represented by handle 166 for opening and closing valve 164. The hydraulic fluid to and from valves 164 and 166 is carried by hydraulic lines 168.

Adjacent valve 164 and on the base 10 is another valve 170, having a nest of fluid carrying lines 171 connected thereto, for controlling the speed of rotation of the pedestal 63. This valve 170 like the other three shown on the base 10 has a needle metering valve 172 designed to perform the same function as the other needle metering valves. Further valve 170 has a valve adjacent thereto represented by handle 174.

The method of operation of the valves represented by the handles 166 and 174 attached indirectly to valves 164 and 170 is as follows: The needle valve 167 and 172 for each main valve 164 and 170 is adjusted to permit the entrance of a certain amount of fluid thereinto. The main valve 164 and 170 is adjusted by handles 176 and 178 for a certain speed of the pedestal 63 or spindle 122. The handles 166 and 174 may be moved the full amount of permitted travel to obtain this speed or an incremental part of the travel to obtain a portion of the speed.

There is an additional line 180 that projects from the back of the base 10 toward the front and through the column 12. This line carries a coolant from a source for the cutting instrument 158. As illustrated in Figures 1 and 4 the line 180 enters the back of the spindle 122. The spindle 122 is hollow and the coolant discharges from the center of the tool 158 onto the material 66. This line 180 may have a T-fitting at that point on the front of the column from which it projects and in addition to entering the spindle 122 another line may be directed onto the material 66.

Finally, there is connected to the ram 98 a hollow cylinder 182 into which is chucked a roller cam 184. The roller engages a template 186 on bed 16 and when the bed is in motion the cam is caused to follow the configuration of the template resulting in raising and lowering the ram 98.

When the roller cam 184 and template 186 are in use the ram 98 is not controlled by hydraulic fluid nor is it locked in a pre-selected position. The ram 98 is free to rise and fall as a result of the action of the cam roller 184 following the template 186. The movement of the ram is of course transmitted to the cutting tool 158 and the configuration of the template is transferred to the material 66 to be ground or cut.

The template 186, as illustrated, has an exaggerated pattern formed therein for the purpose of illustration. Normally the pattern of the template 186 will be more modified than that shown.

The operation of the invention is as follows: Assume the template 186 and roller cam 184 to be used. The material 66 is placed on the plate 64 and over the grid of proper size, and a vacuum is imposed on the material, through the various vacuum lines 10, 74 and 76, to rigidly hold the same in place.

The table 46 is properly located, with respect to the material, through the handle 60 of the worm gear drive. The bed 16 is also positioned, with respect to the template, through the medium of wheel 40 of the worm gear drive.

The speed of travel for the bed 16 is determined and the needle valve 30 is set to permit entrance of the proper amount of hydraulic fluid into valve 26. This same procedure is followed regarding valve 170 and needle valve 172 that controls the speed of the pedestal 63. The needle valve 172 is adjusted to permit a determined amount of hydraulic fluid to enter valve 170.

As stated before the ram is left free to rise and fall and is controlled by the dictates of the roller cam 184 and template 186.

If it is necessary to grind or cut the material in the manner illustrated in Figure 3 of the drawings, the spindle 122 is rotated from the vertical to the inclined position through the medium of adjustments 154, 156, 158.

The stops 24 on base 10 are properly positioned in the slotted bar 18 in order to limit the path of travel of the bed 16.

Once the machine is set up to make a cut or grind the material 66, the hydraulic fluid is permitted to flow unrestricted through the respective hydraulic lines by operating handles 28, 174, and 178 of the hydraulic valves. The pedestal 63 rotates while at the same time the bed 16 travels a full cycle of travel. The hydraulic valve trip 42 is struck by one of the pins 22 in the manner previously described and the bed 16 reverses its path of travel.

The table 46 may have its position changed at any time through the medium of the worm gear and handle 60.

Coolant of course is directed on to the material 66 through the coolant system 180, 78, 80, 82, and 86.

On completion of the operation the reverse of the procedure just outlined is followed.

Now assume that the roller cam 184 and 186 are not to be used. The general procedure just described is again followed. However, a few additional steps are made with regard to the ram.

The spindle 122 may be maintained in the inclined position or returned to the vertical.

The hydraulic valve system 150 is adjusted to permit an incremental downward movement of the ram 98. The stops 104 on the ram 98 are positioned in the bar 100 and the ram is raised or lowered mechanically to the proper position through the worm gear drive system 110, 112, 114, 116, and 117. Once this has been determined, the needle valve 126 is opened to permit fluid to enter valve 124 and hydraulic fluid is made available to trip valve 106. Additionally, hydraulic fluid is transmitted to the spindle 122 through the proper lines and the same is done to actuate the motor 88 to rotate the pedestal 63.

When all the equipment and structure is in readiness the procedure previously referred to is followed and the material is ground or cut to the desired configuration.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A machine for shaping blanks of solid materials comprising a base and a column; a reciprocable bed on said base that is hydraulically actuated; a reciprocable table on said bed that travels in a path transverse to that of said bed and is mechanically actuated; a rotary pedestal on said table that is hydraulically actuated; a vacuum line connected to said pedestal for imposing a vacuum to retain the material to be shaped thereon; a reciprocable ram on said column that is hydraulically and mechanically actuated; a hydraulic spindle on said ram that is rotatable about its own axis and has a cutting tool chucked therein that engages the material to form it into the shapes desired; and a hydraulic motor connected to said spindle for rotating the cutting tool; said column having a hydraulic trip valve thereon engaged by spaced apart stops on said ram for limiting and reversing the path of travel of said ram in each direction.

2. A machine for shaping blanks of solid materials comprising a base and a column; a reciprocable bed on said base that is hydraulically actuated; a reciprocable table on said bed that travels in a path transverse to that of said bed and is mechanically actuated; a rotary pedestal on said table that is hydraulically actuated; a vacuum line connected to said pedestal for imposing a vacuum to retain the material to be shaped thereon; a reciprocable ram on said column that is hydraulically and mechanically actuated; a hydraulic spindle on said ram that is rotatable about its own axis and has a cutting tool chucked therein that engages the material to form it into the shapes desired; a hydraulic motor connected to said spindle for rotating the cutting tool; and a hydraulic valve system mounted on said column and interconnected to said ram for lowering the ram each time said bed completes a path of travel in one direction and returns.

3. A machine for shaping blanks of solid materials comprising a base and a column; a reciprocable bed on said base that is hydraulically actuated; a reciprocable table on said bed that travels in a path transverse to that of said bed and is mechanically actuated; a rotary pedestal on said table that is hydraulically actuated; a vacuum line connected to said pedestal for imposing a vacuum to retain the material to be shaped thereon; a reciprocable ram on said column that is hydraulically and mechanically actuated; a hydraulic spindle on said ram that is rotatable about its own axis and has a cutting tool chucked therein that engages the material to form it into the shapes desired; and a hydraulic motor connected to said spindle for rotating the cutting tool; said spindle having a coarse, fine and intermediate adjustment for positioning the same when it is rotated about its own axis.

4. A machine for shaping blanks of solid materials comprising a base and a column; a reciprocable bed on said base that is hydraulically actuated; a reciprocable table on said bed that travels in a path transverse to that of said bed and is mechanically actuated; a rotary pedestal on said table that is hydraulically actuated; a vacuum line connected to said pedestal for imposing a vacuum to retain the material to be shaped thereon; a reciprocable ram on said column that is hydraulically and mechanically actuated; a hydraulic spindle on said ram that is rotatable about its own axis and has a cutting tool chucked therein that engages the material to form it into the shapes desired; and a hydraulic motor connected to said spindle for rotating the cutting tool; said bed having spaced apart stops thereon that engage a hydraulic trip valve on said base for limiting and reversing the path of travel of said bed in each direction; said ram having spaced apart stops thereon that engage a hydraulic trip valve on said column for limiting and reversing the path of travel of said ram in each direction.

5. A machine for shaping blanks of solid materials comprising a base and a column; a reciprocable bed on said base that is hydraulically actuated; a reciprocable table on said bed that travels in a path transverse to that of said bed and is mechanically actuated; a rotary pedestal on said table that is hydraulically actuated; a vacuum line connected to said pedestal for imposing a vacuum to retain the material to be shaped thereon; a reciprocable ram on said column that is hydraulically and mechanically actuated; a hydraulic spindle on said ram that is rotatable about its own axis and has a cutting tool chucked therein that engages the material to form it into the shapes desired; a hydraulic motor connected to said spindle for rotating the cutting tool; said bed having spaced apart stops thereon that engage a hydraulic trip valve on said base for limiting and reversing the path of travel of said bed in each direction; and a hydraulic valve system mounted on said column and interconnected to said ram for lowering the ram each time said bed completes a path of travel in one direction and returns.

6. A machine for shaping blanks of solid materials comprising a base and a column; a reciprocable bed on said base that is hydraulically actuated; a reciprocable table on said bed that travels in a path transverse to that of said bed and is mechanically actuated; a rotary pedestal on said table that is hydraulically actuated; a vacuum line connected to said pedestal for imposing a vacuum to retain the material to be shaped thereon; a reciprocable ram on said column that is hydraulically and mechanically actuated; a hydraulic spindle on said ram that is rotatable about its own axis and has a cutting tool chucked therein that engages the material to form it into the shapes desired; and a hydraulic motor connected to said spindle for rotating the cutting tool; said bed having spaced apart stops thereon that engage a hydraulic trip valve on said base for limiting and reversing the path of travel of said bed in each direction; said spindle having a coarse, fine and intermediate adjustment for positioning the same when it is rotated about its own axis.

7. A machine for shaping blanks of solid materials comprising a base and a column; a reciprocable bed on said base that is hydraulically actuated; a reciprocable table on said bed that travels in a path transverse to that of said bed and is mechanically actuated; a rotary pedestal on said table that is hydraulically actuated; a vacuum line connected to said pedestal for imposing a vacuum to retain the material to be shaped thereon; a reciprocable ram on said column that is hydraulically and mechanically actuated; a hydraulic spindle on said ram that is rotatable about its own axis and has a cutting tool chucked therein that engages the material to form it into the shapes desired; a hydraulic motor connected to said spindle for rotating the cutting tool; said ram having spaced apart stops thereon that engage a hydraulic trip valve on said column for limiting and reversing the path of travel of said ram in each direction; and a hydraulic valve system mounted on said column and interconnected to said ram for lowering the ram each time said bed completes a path of travel in one direction and returns.

8. A machine for shaping blanks of solid materials comprising a base and a column; a reciprocable bed on said base that is hydraulically actuated; a reciprocable table on said bed that travels in a path transverse to that of said bed and is mechanically actuated; a rotary pedestal on said table that is hydraulically actuated; a vacuum line connected to said pedestal for imposing a vacuum to retain the material to be shaped thereon; a reciprocable ram on said column that is hydraulically and mechanically actuated; a hydraulic spindle on said ram that is rotatable about its own axis and has a cutting tool chucked therein that engages the material to form it into the shapes desired; and a hydraulic motor connected to said spindle for rotating the cutting tool; said ram having spaced apart stops thereon that engage a hydraulic trip valve on said column for limiting and reversing the path of travel of said ram in each direction; said spindle having a coarse, fine and intermediate adjustment for positioning the same when it is rotated about its own axis.

References Cited in the file of this patent

UNITED STATES PATENTS

| | | |
|---|---|---|
| 1,877,500 | Einstein | Sept. 13, 1932 |
| 1,918,668 | Reusser | July 18, 1933 |
| 2,005,331 | Asbridge | June 18, 1935 |
| 2,362,873 | Wessman | Nov. 14, 1944 |
| 2,392,819 | Gruenberg | Jan. 15, 1946 |
| 2,548,277 | Whittlesey | Apr. 10, 1951 |
| 2,565,020 | Christman | Aug. 21, 1951 |
| 2,688,213 | Dyer | Sept. 7, 1954 |
| 2,704,424 | D'Avaucourt | Mar. 22, 1955 |